United States Patent
Bueno De Santiago et al.

(10) Patent No.: US 10,193,402 B2
(45) Date of Patent: Jan. 29, 2019

(54) FASTENING SYSTEM FOR COUPLING ELECTRICAL MACHINE COMPONENTS

(71) Applicant: ALSTOM RENEWABLE TECHNOLOGIES, Grenoble (FR)

(72) Inventors: Adrian Bueno De Santiago, Barcelona (ES); José Luis Román Mallada, Sant Just Desvern (ES); Santiago Claramunt Estecha, Barcelona (ES)

(73) Assignee: GE RENEWABLE TECHNOLOGIES WIND B.V., Breda (NL)

(*) Notice: Subject to any disclaimer, the term of this patent is extended or adjusted under 35 U.S.C. 154(b) by 212 days.

(21) Appl. No.: 14/860,621

(22) Filed: Sep. 21, 2015

(65) Prior Publication Data

US 2016/0094094 A1  Mar. 31, 2016

(30) Foreign Application Priority Data

Sep. 26, 2014 (EP) .................................. 14382368

(51) Int. Cl.
*H02K 1/06* (2006.01)
*H02K 1/18* (2006.01)
(Continued)

(52) U.S. Cl.
CPC ............ *H02K 1/148* (2013.01); *F03D 9/25* (2016.05); *H02K 1/06* (2013.01); *H02K 1/18* (2013.01);
(Continued)

(58) Field of Classification Search
CPC ........ H02K 1/27–1/2793; H02K 1/148; H02K 1/00–1/34
(Continued)

(56) References Cited

U.S. PATENT DOCUMENTS 6,448,685 B1 * 9/2002 Mayer ................... H02K 1/148
310/216.051
2002/0047462 A1  4/2002 Mayer
(Continued)

FOREIGN PATENT DOCUMENTS

DE  102012022868 A1  5/2014
EP  2 348 619 A1  7/2011
(Continued)

OTHER PUBLICATIONS

Machine Translation, Takenaga, WO 2011125183 A1, Oct. 2011.*
(Continued)

*Primary Examiner* — Thomas Truong
(74) *Attorney, Agent, or Firm* — Dority & Manning, P.A.

(57) ABSTRACT

An electrical machine comprising a first item having a male portion and a second item having a female portion. The male and female portions have a shape adapted to each other such that the male portion can be fitted into the female portion. The male and/or female portion is formed as a stack of sheets comprising standard sheets and protruding sheets. The "male" standard sheets substantially fit into the female portion and the "male" protruding sheets are larger than the female portion such that, in use, said protruding sheets are deformed during insertion of the male portion into the female portion. The "female" standard sheets have an opening into which the male portion substantially fits, and the "female" protruding sheets have an opening smaller than the male portion such that, in use, said protruding sheets are deformed during insertion of the male portion into the opening of the female portion.

9 Claims, 4 Drawing Sheets

(51) Int. Cl.
- *H02K 1/28* (2006.01)
- *H02K 1/14* (2006.01)
- *H02K 1/27* (2006.01)
- *F03D 9/25* (2016.01)
- *H02K 7/18* (2006.01)

(52) U.S. Cl.
CPC ............... *H02K 1/276* (2013.01); *H02K 1/28* (2013.01); *H02K 7/1838* (2013.01); *Y02E 10/725* (2013.01)

(58) Field of Classification Search
USPC .... 310/216.015, 216.007, 216.008, 216.029, 310/216.098, 216.079, 216.086, 216.051, 310/216.052, 433, 156.53, 156.56
See application file for complete search history.

(56) References Cited

U.S. PATENT DOCUMENTS

| | | | | |
|---|---|---|---|---|
| 2003/0098628 A1* | 5/2003 | Enomoto | ............... | H02K 1/187 310/216.057 |
| 2004/0189137 A1* | 9/2004 | Hashimoto | ............ | H02K 1/148 310/402 |
| 2005/0275305 A1 | 12/2005 | Nommensen et al. | | |
| 2010/0259125 A1* | 10/2010 | Asano | .................... | F04C 23/02 310/216.015 |
| 2010/0277017 A1* | 11/2010 | Alexander | ........... | H02K 1/2773 310/61 |
| 2012/0007464 A1* | 1/2012 | Saito | ...................... | H02K 1/276 310/216.051 |
| 2013/0200746 A1* | 8/2013 | Foulsham | .............. | H02K 1/148 310/216.007 |

FOREIGN PATENT DOCUMENTS

| | | | |
|---|---|---|---|
| EP | 2 523 316 A1 | 11/2012 | |
| FR | 2 837632 A1 | 9/2003 | |
| JP | WO 2011125183 A1 * | 10/2011 | ........... H02K 1/2766 |
| WO | WO 2011/125183 A1 | 10/2011 | |

OTHER PUBLICATIONS

European Search Report for EP 14382368.0, dated Feb. 6, 2015, 12 pgs.
EPO Office Action, dated Dec. 14, 2017.

* cited by examiner

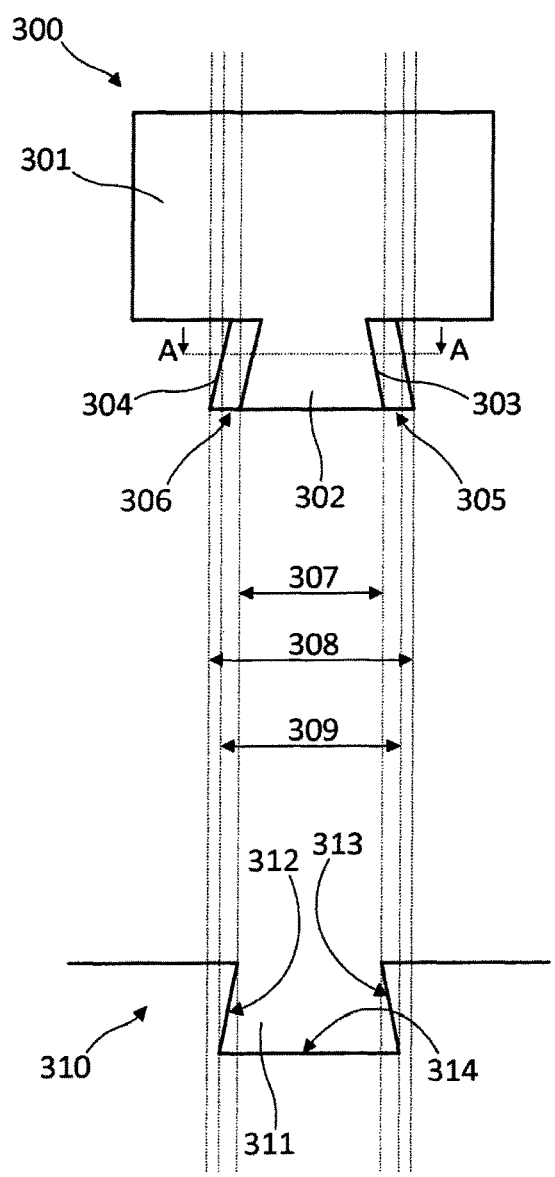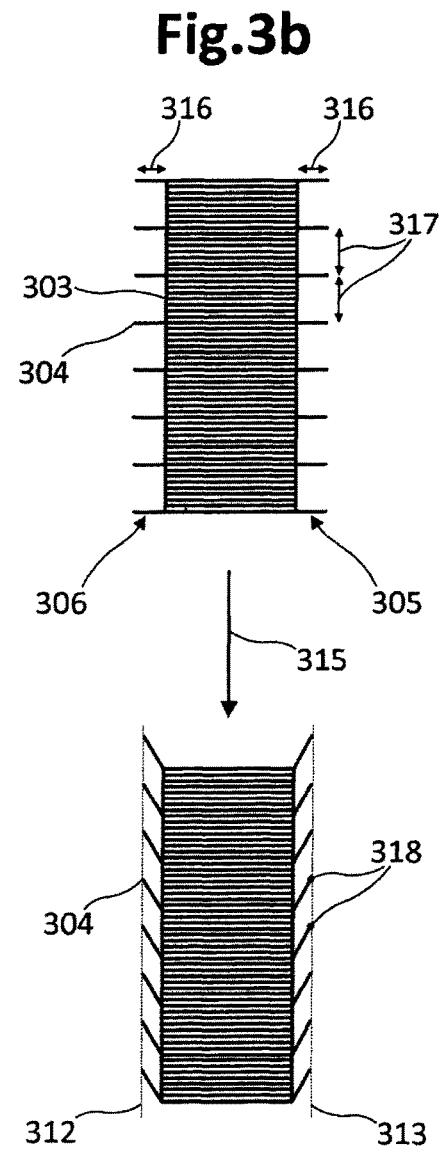

FASTENING SYSTEM FOR COUPLING ELECTRICAL MACHINE COMPONENTS

This application claims priority to European application no. 14382368.0, filed Sep. 26, 2014, the entire contents of which are hereby incorporated by reference for all purposes.

The present disclosure relates to methods and systems for fastening a first item to a second item of an electrical machine, such as e.g. a generator or a motor.

BACKGROUND ART

Modern wind turbines are commonly used to supply electricity into the electrical grid. Wind turbines of this kind generally comprise a tower and a rotor arranged on the tower. The rotor, which typically comprises a hub and a plurality of blades, is set into rotation under the influence of the wind on the blades. Said rotation is normally transmitted through a rotor shaft to a generator, either directly or through the use of a gearbox. This way, the generator can produce electricity which can be supplied to the electrical grid.

Particularly for offshore wind turbines, direct drive systems employing permanent magnets are usually chosen. A permanent magnet generator may be defined as a generator where the excitation field is provided by permanent magnets instead of coils (electromagnets).

Permanent magnets may be attached to the rotor in different ways, such as e.g. glued to a rotor body, by stamping the ends of the magnets to hold them in place, through the use of clamps coupled to the rotor body or directly to the rotor rim, by welding, through bolted connections, etc.

Assembling a large generator may require complicated, costly and lengthy processes.

For example, large amounts of welding, bolts, glue, etc. and their processing may be required for fastening magnets to a generator rotor and coils to a stator. Processes of welding, gluing, screwing etc. may be time consuming and labour intensive. Hence, prior art approaches of fastening items in an electrical machine may be rather complex and expensive.

Besides, when glue is used, fastening of one item to another may deteriorate over time. Therefore, in this case, the attachment may not be reliable enough after a certain time of its implementation.

In order to improve the assembly process, it is known to provide permanent magnet modules, which may be attached to the rotor as a single item.

A permanent magnet module may be defined as a unit having a plurality of permanent magnets, such that the plurality of magnets can be mounted and unmounted together. Such a module may have a module base with a shape suitable for housing a plurality of permanent magnets that may be fixed to the base. The base may be configured to be fixed to a rotor rim in such a way that the plurality of magnets are fixed together to the rotor rim through the module base. The use of permanent magnet modules may facilitate the manufacturing of a generator rotor.

In an electrical machine (e.g. a wind turbine generator), coils are necessary with the role of e.g. generating an electric current as a result of their interaction with the magnetic (or excitation) field generated by e.g. permanent magnets. The coils may also be arranged in modules including a plurality of stator teeth. A stator tooth, which may support one or more coils, is typically fastened to a corresponding housing of the stator.

For the sake of simplicity, a group or assembly of stator teeth with attached coils may also be referred to herein as a coil module. Stator teeth may be attached to the stator based on the same foundations or similar to those commented with respect to attaching permanent magnets to the rotor, based on e.g. welding, bolted connections, etc.

Coil modules may be defined in a similar way as permanent magnet modules have been defined before. In this case, however, coil modules support coils instead of permanent magnets, and coil modules are typically attached to the stator instead of to the rotor.

Coil modules and permanent magnet modules may have a module base formed as a stack of sheets which may be separated from each other by means of electrically insulating material. With this feature, eddy currents may be reduced in corresponding electrical machine such that its efficiency may be improved.

Generators of considerable dimensions and having the same necessity (of fastening one item to another item) may also be found in e.g. steam turbines and water turbines.

The present disclosure aims at improving the prior art systems for fastening an item to another item in an electrical machine.

SUMMARY

In a first aspect, an electrical machine is provided. The electrical machine comprises a first item having a male portion and a second item having a female portion with an opening. The shape of the male portion and the shape of the female portion are adapted to each other such that the male portion can be fitted into the opening of the female portion. The male portion is formed as a stack of sheets having a plurality of standard sheets and one or more protruding sheets.

Said standard sheets substantially fit into the opening of the female portion, and the one or more protruding sheets have dimensions larger than the opening of the female portion such that, in use, the one or more protruding sheets are deformed during insertion of the male portion into the opening of the female portion.

In a second aspect, an electrical machine is provided. The electrical machine comprises a first item having a male portion and a second item having a female portion with an opening. The shape of the male portion and the shape of the female portion are adapted to each other such that the male portion can be fitted into the opening of the female portion. The female portion is formed as a stack of sheets having a plurality of standard sheets with an opening into which the male portion substantially fits and one or more protruding sheets with an opening with dimensions smaller than the male portion such that, in use, the one or more protruding sheets are deformed during insertion of the male portion into the opening of the female portion.

In a third aspect, an electrical machine is provided. The electrical machine comprises a first item having a male portion and a second item having a female portion with an opening. The shape of the male portion and the shape of the female portion are adapted to each other such that the male portion can be fitted into the opening of the female portion. The male portion and the female portion are formed as a stack of sheets having a plurality of standard sheets and one or more protruding sheets.

The standard sheets of the male portion substantially fit into the opening of the female portion, and the one or more protruding sheets of the male portion have dimensions larger than the opening of the female portion such that, in use, the one or more protruding sheets are deformed during insertion of the male portion into the opening of the female portion.

The standard sheets of the female portion have an opening into which the male portion substantially fits, and the one or more protruding sheets of the female portion have an opening with dimensions smaller than the male portion such that, in use, the one or more protruding sheets are deformed during insertion of the male portion into the opening of the female portion.

The proposed fastening system, in any of the above first, second and third aspects, does not require extra material (e.g. welding, bolts, etc.) because the fastening of the first item to the second item results from the interaction between the protruding sheets of one of the male/female portions and corresponding surface(s) of the other of the male/female portions.

For instance, if both the male portion and the female portion have protruding sheets, the fastening may result from the interaction between the protruding sheets of the male portion and corresponding surfaces of the female portion, and from the interaction between the protruding sheets of the female portion and corresponding surfaces of the male portion.

The insertion of the male portion into the female portion only requires pushing the male portion with a minimum force in a suitable direction. Equivalently, the insertion of the male portion into the female portion may also be implemented by pushing the item having the female portion in such a way that coupling between the male and the female portion is finally achieved.

This pushing force may be of a magnitude enough for overcoming the opposition presented by the protruding sheets during the coupling of the male portion into the female portion. The pushing of the male portion may be performed with the assistance of a hydraulic piston or similar apparatus to exert the necessary force.

The opposing force presented by the protruding sheets may result from their resistance to be bent. Once this resistance has been overcome, the initial opposing force may be "transformed" into a pressure by the protruding sheets against corresponding surface(s) of the male/female portion(s). This pressure may relatively securely fasten the first item to the second item.

A fastening system and method is therefore provided which does not require any extra material, such as e.g. welding, bolts, etc., and whose operation is relatively easy, since only pushing of the male/female portion is required. Hence, the suggested fastening system may be cheaper and of simpler operation in comparison with prior art fastening systems.

Depending on the implementation chosen, the deformation of the protruding sheets may be predominantly elastic or predominantly plastic. In the case of elastic deformation, the protruding sheets may have a resilience such that the deformed sheets exert a pressure to corresponding surface(s) of the male/female portion(s).

In some implementations, the one or more protruding sheets may comprise a plurality of protruding sheets, such that the "fastening" pressure against corresponding surface(s) of the male/female portion may be distributed at different points of said corresponding surface(s). This may increase the effectiveness of the fastening system.

According to examples, only the male portion is formed as a stack of sheets comprising a plurality of standard sheets having a size smaller than a gap size between inner surfaces of the female portion. Furthermore, the one or more protruding sheets may have a size greater than the gap size between inner surfaces of the female portion. Said greater size may cause the deformation of the protruding sheets during insertion of the male portion into the female portion.

In other words, the male portion may be formed by laminations of two different sizes: a smaller size and a larger size. The sheets with the smaller size may fit the female portion without any opposition during insertion of the male into the female portion. The sheets with the larger size may fit the female region only if they are bent as a result of their interference with inner surfaces of the female portion.

The bending of the sheets with the greater size may generate an opposition (to the pushing of the male portion into the female portion) which may finally result in a pressing force that may fasten the first item to the second item in a reliable manner.

The above principle expressed in terms of laminations of smaller and larger size may be similarly applied to configurations in which the female portion has protruding sheets which are bent when interacting with corresponding side surface(s) of the male portion.

According to implementations of the fastening system, the protruding sheets (of the male and/or female portion) may protrude with respect to the standard sheets at a first and a second side of the male and/or female portion, said second side being the opposite to the first side. This may cause a more balanced, and thus more effective, fastening.

In some examples, the protruding sheets may be arranged in the stack of sheets (of the male and/or female portion) in such a way that substantially the same number of standard sheets is arranged between each two consecutive protruding sheets. This may cause a substantially uniform distribution of the fastening pressure along corresponding surface(s) of the male and/or female portion. In other words, the bent sheets may press against points of a corresponding surface (of the male and/or female portion) that may be substantially uniformly distributed along said surface. This may therefore result in a still more balanced (and effective) fastening.

In configurations of the fastening system, the male portion and the female portion may have a dovetail shape. A dovetail shape is a well-known shape for use in male-female fitting arrangements.

In some examples, the first item may be a magnet module and the second item may be a rotor rim, even though, alternatively, the first item may be a rotor rim and the second item may be a magnet module. In both cases, the magnet module may be effectively fastened to the rotor rim through any of the previous fastening systems.

In alternative configurations, the first item may be a stator tooth and the second item may be a stator housing, although, alternatively, the first item may be a stator housing and the second item may be a stator tooth. In both cases, the stator tooth may be effectively fastened to the stator housing through any of the previous fastening systems. The stator tooth may support either a single coil or a plurality of coils.

In some of the examples wherein one of the (first and second) items is a stator tooth and the other of the (first and second) items is a stator housing, the stator housing may be made of a non-magnetic and electrically non-conductive material.

Alternatively or in addition hereto, the male or female portion of the stator housing and/or the male portion of the stator teeth may be coated with non-magnetic and electrically non-conductive material. An aspect of these features may be that eddy currents between the stator tooth (and supported coils) and the stator housing may be reduced or avoided.

In some examples, a generator may be provided comprising any of the fastening systems previously described.

According to examples, a wind turbine may be provided comprising any of the generators described before.

BRIEF DESCRIPTION OF THE DRAWINGS

Non-limiting examples of the present disclosure will be described in the following, with reference to the appended drawings, in which:

FIG. 2b schematically represents a perspective view of one of the stator teeth shown in FIG. 2a;

FIG. 3a schematically represents a front view of a module and a rotor/stator region with a fastening system similar to the ones shown in FIGS. 1, 2a and 2b;

FIG. 3b schematically represents a sectional view of a male portion of the fastening system of FIG. 3a not inserted in corresponding female portion;

FIG. 3c schematically represents a sectional view of the male portion of the fastening system of FIG. 3a inserted in corresponding female portion.

DETAILED DESCRIPTION OF EXAMPLES

Figure 1:
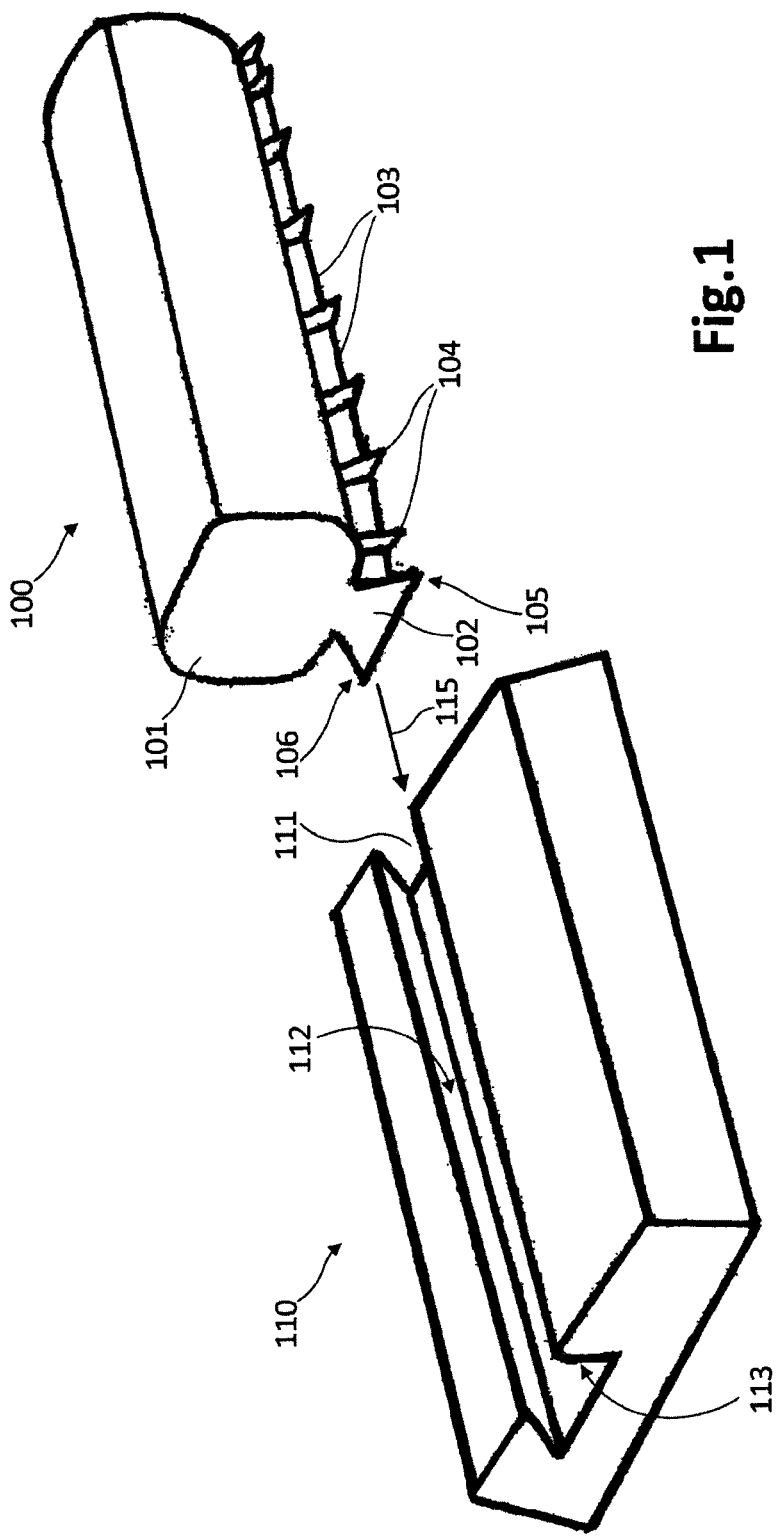
FIG. 1 schematically represents a perspective view of a permanent magnet module and a rotor region having a fastening system according to an example.

FIG. 1 schematically represents a perspective view of a permanent magnet module 100 and a rotor region 110 having a fastening system according to an example. The fastening system may comprise a male portion 102 in the permanent magnet module 100 and a female portion 111 in the rotor region 110. The male region 102 and the female region 111 are shown having mating dovetail shapes.

The male portion 102 may be fittable into the female portion 111, and the male portion 102 may be formed as a stack of sheets. The stack of sheets may comprise one or more protruding sheets 104 with a resilience such that, in use, the one or more protruding sheets 104 may experience a double effect when interfering with inner surfaces 112, 113 of the female portion 111.

A first effect may be the bending of the one or more protruding sheets 104 during insertion of the male portion 102 into the female portion 111. A second effect may be that, once the insertion (of the male portion 102 into the female portion 111) has been substantially completed, the one or more bent sheets 104 may exert a pressure against inner surfaces 112, 113 of the female portion 111. This pressure may cause an effective fastening of the first item 100 to the second item 110.

The resilience (i.e. resistance to be bent) of the protruding sheets 104 may be of a magnitude such that the aforementioned double effect may be suitably achieved. This magnitude of the resilience may be achieved, for example, by fabricating the protruding laminations 104 of a proper material, with an appropriate thickness, etc.

Besides the resilience, a suitable size configuration may also be given to the stack of sheets for achieving the aforementioned double effect (of bending and subsequent pressure).

For example, the stack of sheets (of the male portion 102) may comprise a plurality of standard sheets 103 having a size smaller than a gap size between inner surfaces 112, 113 of the female portion 111, and the protruding sheets 104 may have a size greater than said gap size (between inner surfaces 112, 113 of the female portion 111). Details about this size configuration are provided in other parts of the description.

The insertion of the male portion 102 into the female portion 111 may be performed by pushing the male portion 102 in a fitting direction 115 and with a certain pushing force.

The pushing of the male portion 102 may be assisted with a hydraulic piston (or similar device) for causing the pushing force to overcome an opposing force exerted by the protruding sheets 104 as a result of their greater size with respect to the gap size of the female portion 111. No opposition by the standard laminations 103 may occur because they have a smaller size with respect to the gap size of the female portion 111.

An enough pushing force may force the protruding sheets 104 to bend as a result of their interference with inner surfaces 112, 113 of the female portion 111. Once the insertion of the male portion 102 into the female portion 111 has been substantially completed, the resilience of the protruding sheets 104 may cause them to press against inner surfaces of the female portion 111 in such a way that a relatively strong fastening of the first item 100 to the second item 110 may be achieved.

The protruding sheets 104 may protrude with respect to the standard sheets 103 at a first side 105 and a second side 106 of the male portion 102. Said second side 106 may be the opposite to the first side 105.

The protruding sheets 104 may protrude with respect to the standard sheets 103 at the first and second sides 105, 106 of the male portion 102 to substantially the same extent. An aspect of this feature may be that a substantially equal pressure force against both inner side surfaces 112, 113 (of the female portion 111) may be exerted by the protruding laminations 104. Therefore, a substantially balanced fastening of the first item 100 to the second item 110 may be achieved.

The protruding sheets 104 may be arranged in the stack of sheets in such a way that substantially the same number of standard sheets 103 is sandwiched between each two contiguous protruding sheets 104. An aspect of this characteristic may be that the pressure force (exerted by the protruding sheets 104) against inner surfaces 112, 113 of the female portion 111 may be substantially uniformly distributed along inner surfaces 112, 113. Hence, an even more balanced fastening of the first item 100 to the second item 110 may be implemented by the fastening system.

The sheets 103, 104 of the stack of sheets may have been attached to each other through a bonding resin, such as e.g. epoxy, polyester, vinyl ester, etc. Alternatively, the sheets 103, 104 may be attached to each other with an adhesive, such as e.g. a passive adhesive able to be activated by heat.

An adhesive able to be activated by heat may be defined as a passive substance which is not adherent while it is at a temperature below a temperature threshold, but becomes adherent when said temperature threshold is exceeded.

The attachment of the sheets 103, 104 with either resin or passive adhesive may have been performed by using a suitable mold having a heating system for heating the inside of the mold.

In the case of using resin for the attachment between sheets 103, 104, the sheets 103, 104 may be placed stacked inside the mold and, once the mold has been closed, the resin may be introduced through an inlet of the mold aimed at that end. Once the resin has been introduced, operation of the heating system may be caused in order to cure the resin and therefore implementing the attachment between sheets 103, 104.

A vacuum inside the mold may be caused prior to introducing the resin, such that an infusion process may be implemented. The vacuum may be created by sucking air out of the mold through an outlet of the mold aimed at that purpose. With such an infusion process, gaps between sheets 103, 104 may be substantially completely filled with the resin, such that a relatively strong attachment between sheets 103, 104 may be achieved.

In case of using a passive adhesive, one face of the sheets 103, 104 may be (pre)coated with such an adhesive and placed stacked in a mold having a heating system. Then, the mold can be closed and its inside heated by causing operation of the heating system in order to activate the passive adhesive and thus implementing the attachment between sheets 103, 104.

In some configurations, an electrically insulating material may be present between sheets 103, 104 of the stack of sheets. This feature may improve the performance of the module when used e.g. in a generator. In particular, eddy currents may be reduced or avoided.

In some examples, the sheets 103, 104 may be pressed to each other through a pressing mechanism. This pressing mechanism may comprise, for example, a stud and one or more fasteners configured to be fastened at one end or both ends of the stud.

In more particular examples, pressing the stacked metallic sheets 103, 104 may comprise arranging the stud in such a way that the stud extends internally to the stack from one side to the opposite side of the stack, and fastening the one or more fasteners at one end or both ends of the stud.

One end of the stud may be formed as a stopper, i.e. shaped in such a way that retention of sheets 103, 104 is caused at said end. In this case, only one fastener to be placed at the other end (opposite to the stopper end) may be required for exerting the pressure to the stack of laminations 103, 104. In alternative implementations, if the stopper is not present, respective fasteners for both ends of the stud may be needed.

The pressing of the stacked laminations 103, 104 may produce a stack of laminations 103, 104 with a relatively high stiffness, such that the stacked laminations 103, 104 may behave together as (or almost as) a single solid body.

Figure 2A:
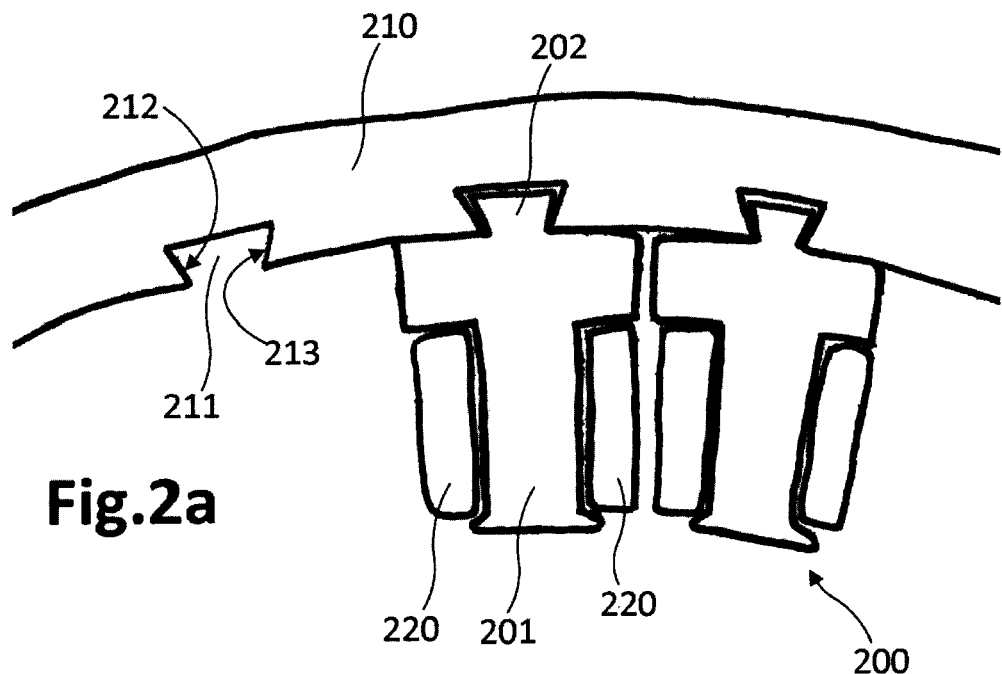
FIG. 2a schematically represents a front view of a stator region and stator teeth having a fastening system similar to the one shown in FIG. 1.
Figure 2B:
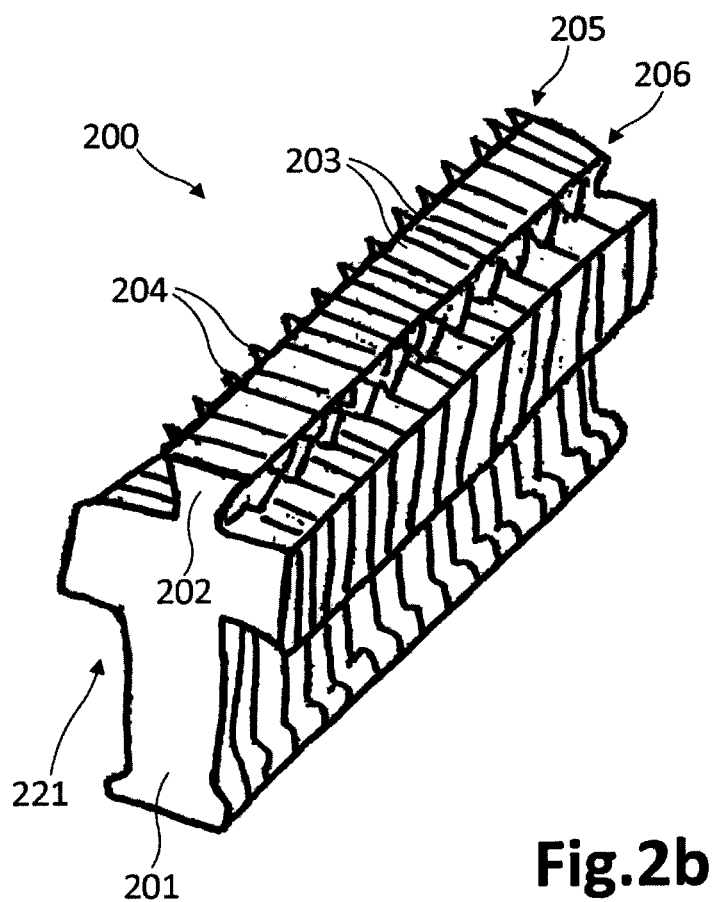

FIG. 2a schematically represents a front view of a stator region 210 and stator teeth 200 with a fastening system similar to the one shown in FIG. 1. FIG. 2b schematically represents a perspective view of one of the stator teeth 200 shown in FIG. 2a.

The stator region (or stator housing) 210 is shown in FIG. 2a having female portions 211 each configured in such a way that a male portion 202 of a stator tooth 200 can be fitted in the female portion 211. In this particular case, the male and female portions 202, 211 are also shown having a dovetail shape.

Two stator teeth 200 are shown in FIG. 2a fastened to the stator housing 210, each having its male portion 202 inserted into a female portion 211 of the stator housing 210. A stator tooth 200 may comprise a main body 201 having receptacles 221 configured in such a way that coils 220 can be fixed to them.

Similarly to the configuration of FIG. 1, the stator tooth 200 of FIG. 2b is shown formed as a stack of sheets 203, 204. The stack of sheets 203, 204 may comprise standard sheets 203 and protruding sheets 204 at the male portion 202. The protruding sheets 204 are shown protruding with respect to the standard sheets 203 at a first side 205 and at a second side 206 opposite to said first side 205.

The protruding sheets 204 may be configured in such a way that they may be bent during insertion of the male portion 202 into the female portion 211 and, once the insertion has been substantially completed, the bent sheets 204 may exert a pressure against inner surfaces 212, 213 of the female portion 211. This pressure may cause an effective fastening of the stator tooth 200 to the stator housing 210.

The same or similar principles about the configuration of the sheets and/or the stack of sheets (such as e.g. size of sheets, attachment of sheets, etc.) explained with respect to FIG. 1 are generally applicable to the configuration of FIGS. 2a and 2b.

The stator housing 210 may be made of a non-magnetic and electrically non-conductive material, such as e.g. some types of fiberglass. An aspect of this feature may be that eddy currents (which may affect negatively the generation of electricity) may be avoided between the stator teeth 200 and the stator housing 210. Therefore, more efficient stators may be configured with this feature.

In alternative implementations also aimed at avoiding eddy currents, the stator housing 210 may be made of a magnetic and/or electrically conductive material, and the female portion 211 of the stator housing 210 may be coated with non-magnetic and electrically non-conductive material. For example, the female portion 211 may be coated with ceramic.

In further alternative examples also aimed at avoiding eddy currents, the stator housing 210 may be made of a magnetic and/or electrically conductive material, and the male portion 202 of the stator tooth 200 may be coated with non-magnetic and electrically non-conductive material. For example, the male portion 202 may be coated with ceramic.

FIG. 3a schematically represents a front view of a module 300 and a rotor/stator region 310 with a fastening system similar to the ones shown in FIGS. 1, 2a and 2b. This FIG. 3a offers a more detailed illustration of how the sheets 303, 304 of a male portion 302 and a corresponding female portion 311 may be sized to achieve an effective fastening.

The module 300 (which may be e.g. a permanent magnet module or a coils module) is shown comprising a main body 301 and a male portion 302. The male portion 302 is shown having sheets 303, 304 of two different sizes: a larger size 308 and a smaller size 307.

The sheets 304 of larger size 308 (or protruding sheets) may protrude with respect to the sheets 303 of smaller size 307 (or standard sheets) at a first side 305 and at a second side 306 of the male portion 302, said second side 306 being the opposite to the first side 305.

The rotor or stator region 310 (which may be a rotor rim region or a stator housing region) is shown comprising a female portion 311 into which the male portion 302 may be inserted. Both the male and female portions 302, 311 are shown having a dovetail shape.

The standard sheets 303 (of the male portion 302) may have a size 307 smaller than a gap size 309 between inner surfaces 312, 313 of the female portion 311. The protruding sheets 304 (of the male portion 302) may have a size 308 greater than the size 307 of the standard sheets 303 and the gap size 309 of the female portion 311.

FIGS. 3b and 3c schematically represents a sectional view of the male portion 302 of the fastening system of FIG. 3a. In FIG. 3b, the male portion 302 is shown not inserted in corresponding female portion 311. In FIG. 3c, the male portion 302 is shown inserted in the female portion 311 according to a fitting direction 315.

The sectional view of FIGS. 3b and 3c may have been taken according to a plane AA indicated in FIG. 3a.

The male portion 302 is shown in FIGS. 3b and 3c with the protruding sheets 304 arranged in such a way that substantially the same number 317 of standard sheets 303 is sandwiched between each two contiguous protruding sheets 304.

The male portion 302 is also shown in FIGS. 3b and 3c with the protruding sheets 304 protruding with respect to the standard sheets 303 at both sides 305, 306 of the male portion 302 to substantially the same extent 316.

An aspect of the two last features is illustrated in FIG. 3c. The protruding sheets 304 are shown bent as a result of their interference with inner side surfaces 312, 313 of the female portion 311. In particular, the protruding sheets 304 are shown bent in such a way that they press against the inner surfaces 312, 313 at pressing points 318 which may be substantially uniformly distributed along the inner surfaces 312, 313.

This substantially uniform distribution of pressing points 318 may provide a relatively balanced fastening of the module 300 to the rotor or stator region 310.

The same or similar principles about configuration of the sheets and/or the stack of sheets (such as e.g. size of sheets, attachment of sheets, etc.) explained with respect to FIG. 1 are generally applicable to the configuration of FIGS. 3a-3c.

Figure 4:
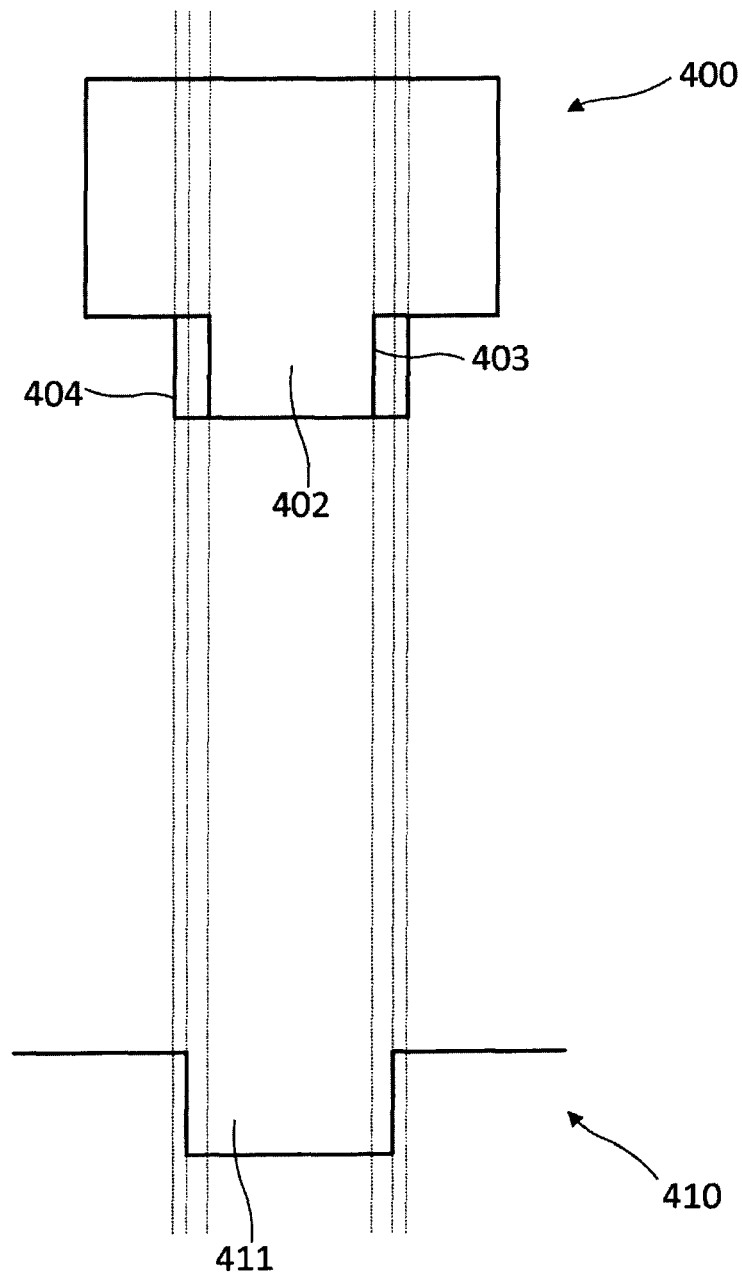
FIG. 4 schematically represents a front view of a module and a rotor/stator region with a fastening system according to another example.

FIG. 4 schematically represents a front view of a module 400 and a rotor/stator region 410 with a fastening system according to an alternative example. The configuration shown in this figure is similar to the ones shown in previous figures. One difference is that, in this case, the module 400 comprises a male portion 402 with protruding sheets 404 and standard sheets 403 having a substantially rectangular shape. Accordingly, the rotor/stator region 410 comprises a female portion 411 also having a substantially rectangular shape.

In the examples described with reference to FIGS. 1-4, only the male portion is provided with protruding sheets. In alternative examples, only the female portion could be provided with protruding sheets in such a way that a fastening substantially equivalent to those discussed in relation to FIGS. 1-4 can be obtained. The female portion could thus be, in these alternative examples, part of an item (e.g. rotor or stator region) formed as a stack of standard and protruding sheets.

Principles, advantages and effects commented with respect to the "male" stacks of sheets of FIGS. 1-4 may be similarly attributed to such "female" stack of sheets, taking into account however corresponding particularities inherent to its "female" shape.

For example, the "female" stack of sheets may comprise standard sheets into which the male portion substantially fits and protruding sheets with dimensions smaller than the male portion such that, in use, the protruding sheets are deformed during insertion of the male portion into the female portion.

In further alternative examples, both the male portion and the female portion may be comprised in respective items (e.g. rotor or stator region and coil or magnet module) formed as a stack of standard and protruding sheets, such that a very effective fastening between said items can be implemented.

In still further alternative examples, the male portion (with or without protruding sheets) may be comprised in the rotor or stator region and the female portion (with or without protruding sheets) may be comprised in the coil or magnet module.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

The invention claimed is:

1. An electrical machine comprising:
a first item having a male dovetail portion; and
a second item having a female dovetail portion with an opening;
wherein:
a shape of the male portion and a shape of the female portion are adapted to each other such that the male dovetail portion can be fit into the opening of the female dovetail portion, and wherein
the first item formed as a stack of sheets comprising a plurality of male standard sheets with the male dovetail portion that substantially fit into the opening of the female dovetail portion and one or more male protruding sheets with dimensions at the male dovetail portion larger than the opening of the female dovetail portion along an entire length of male dovetail portion such that, in use, the male protruding sheets are deformed during insertion of the male dovetail portion into the opening of the female dovetail portion, wherein the first item is a magnet module and the second item is a rotor rim, the magnet module defining a base for housing a plurality of magnets such that the magnets are fixable to the rotor rim via the base; or
wherein the first item is a stator tooth and the second item is a stator housing, the stator tooth defining a base for a plurality of coils such that the coils are fixable to the stator housing via the base.

2. An electrical machine according to claim 1, wherein the one or more male protruding sheets comprise protrusions that protrude with respect to the respective male standard sheets at a first and a second side of the male dovetail portion, respectively, the second side being opposite to the first side.

3. An electrical machine according to claim 2, wherein the one or more male protruding sheets protrude with respect to the male standard sheets, respectively, at the first and second sides of the male dovetail portion to substantially the same extent.

4. An electrical machine according to claim 1, wherein the male protruding sheets are arranged in the stack of sheets of the first item in such a way that substantially a same number of male standard sheets is arranged between any two consecutive male protruding sheets.

5. An electrical machine according to claim 1, wherein:
the male dovetail portion can be fit into the female dovetail portion by following a fitting direction; and
the male protruding sheets are arranged substantially perpendicularly with respect to the fitting direction.

6. An electrical machine according to claim 1, wherein the stator housing is made of a non-magnetic and electrically non-conductive material.

7. An electrical machine according to claim 6, wherein the female dovetail portion of the stator housing and/or the male dovetail portion of the stator tooth is coated with non-magnetic and electrically non-conductive material.

8. An electrical machine according to claim 1, wherein the electrical machine is a generator.

9. A wind turbine comprising a generator according to claim 8.

* * * * *